(12) United States Patent
Scheuten et al.

(10) Patent No.: US 10,977,243 B2
(45) Date of Patent: Apr. 13, 2021

(54) PROCESSING OF TRANSACTION RECORDS IN A DATABASE BASED ON REASON CODES

(71) Applicant: MHI Analytics, LLC, Cincinnati, OH (US)

(72) Inventors: Pieter Scheuten, Denver, CO (US); Steven Paul Miller, Inlet Beach, FL (US); Benjamin Blue Braunheim, Santa Fe, NM (US); Timothy Conn, Overton (GB)

(73) Assignee: Ensemble RCM, LLC, Cincinnati, OH (US)

( * ) Notice: Subject to any disclaimer, the term of this patent is extended or adjusted under 35 U.S.C. 154(b) by 227 days.

(21) Appl. No.: 15/876,529

(22) Filed: Jan. 22, 2018

(65) Prior Publication Data

US 2019/0228091 A1    Jul. 25, 2019

(51) Int. Cl.
*G06F 16/23*        (2019.01)
(52) U.S. Cl.
CPC ...... *G06F 16/2379* (2019.01); *G06F 16/2365* (2019.01)
(58) Field of Classification Search
CPC ............. G06F 16/2379; G06F 16/2365; G06F 16/24565; G06F 16/93
USPC ....................... 707/723, 737, 827
See application file for complete search history.

(56) References Cited

U.S. PATENT DOCUMENTS

| | | | |
|---|---|---|---|
| 5,991,733 A | 11/1999 | Aleia et al. | |
| 6,012,035 A | 1/2000 | Freeman, Jr. et al. | |
| 6,216,109 B1 | 4/2001 | Zweben et al. | |
| 6,256,667 B1 | 7/2001 | Wanghlander et al. | |
| 6,463,346 B1 | 10/2002 | Flockhart et al. | |
| 6,820,266 B1 | 11/2004 | Minakawa et al. | |
| 7,260,553 B2 | 8/2007 | Ebert | |
| 7,667,604 B2 | 2/2010 | Ebert et al. | |
| 8,880,591 B2 | 11/2014 | Feldman et al. | |

(Continued)

OTHER PUBLICATIONS

Douglas et al., "Vectorization, Part 1: The Rise of Parallelism," Quantifi Solutions, Jun. 15, 2017, retrieved from https://www.quantifisolutions.com/vectorization-part-1-the-rise-of-parallelism, 6 pages.

(Continued)

*Primary Examiner* — Dangelino N Gortayo
(74) *Attorney, Agent, or Firm* — Sheridan Ross P.C.

(57) ABSTRACT

Embodiments of the present disclosure are directed to methods and systems for the timely processing of records exchanged between service provider systems and responsible entity systems by a records management and processing system. More specifically, the records management and processing system can maintain a set of rules defining conditions for processing records and associated actions to affect that processing upon satisfaction of or failure to satisfy the conditions of that rule. Updates to some or all of these records can be received from a data update service. The records management and processing system can apply the rules to the records and assign tags to the records based on the received update information and the conditions defined in the applied rules. The records management and processing system can then process the updated records according to workflows for processing the updated records based on the assigned tags and applied rules.

20 Claims, 7 Drawing Sheets

(56) References Cited

U.S. PATENT DOCUMENTS

| | | | |
|---|---|---|---|
| 8,924,269 | B2 | 12/2014 | Seubert et al. |
| 9,282,493 | B2 | 2/2016 | Dietrich |
| 10,528,545 | B1 | 1/2020 | Girulat, Jr. |
| 10,628,553 | B1 | 4/2020 | Murrish et al. |
| 2003/0191669 | A1 | 10/2003 | Fitzgerald et al. |
| 2007/0143610 | A1 | 6/2007 | Machiraju et al. |
| 2007/0162308 | A1 | 7/2007 | Peters |
| 2008/0120205 | A1* | 5/2008 | Hoopes ............... G06Q 10/087 705/28 |
| 2008/0222840 | A1 | 9/2008 | Daly et al. |
| 2009/0106642 | A1 | 4/2009 | Alhomoz et al. |
| 2009/0276243 | A1 | 11/2009 | Fotsch et al. |
| 2012/0078678 | A1 | 3/2012 | Pradhan et al. |
| 2012/0131541 | A1 | 5/2012 | Anetseder |
| 2012/0185275 | A1 | 7/2012 | Loghmani |
| 2012/0215772 | A1 | 8/2012 | Eshwar et al. |
| 2013/0041692 | A1* | 2/2013 | Hasan ................... G06Q 40/08 705/3 |
| 2013/0093759 | A1 | 4/2013 | Bailey |
| 2013/0318135 | A1 | 11/2013 | Nourani |
| 2014/0136237 | A1 | 5/2014 | Anderson et al. |
| 2014/0222684 | A1 | 8/2014 | Felsher |
| 2014/0279329 | A1 | 9/2014 | Dancel |
| 2014/0365241 | A1 | 12/2014 | Dillie et al. |
| 2015/0278699 | A1 | 10/2015 | Danielsson |
| 2015/0310362 | A1* | 10/2015 | Huffman ................ G16H 40/20 705/2 |
| 2016/0253463 | A1 | 9/2016 | Shu et al. |
| 2017/0053014 | A1 | 2/2017 | Lavallee |
| 2017/0053104 | A1 | 2/2017 | Koch et al. |
| 2018/0197145 | A1 | 7/2018 | LaRowe et al. |
| 2018/0260914 | A1 | 9/2018 | Kemp |
| 2018/0301222 | A1* | 10/2018 | Dew, Sr. ................ G06N 5/022 |
| 2018/0350006 | A1* | 12/2018 | Agrawal ............... G06Q 40/12 |
| 2019/0102392 | A1 | 4/2019 | Tseretopoulos et al. |
| 2019/0103174 | A1 | 4/2019 | Power et al. |
| 2019/0179912 | A1 | 6/2019 | Schouten et al. |
| 2019/0179924 | A1 | 6/2019 | Schouten et al. |
| 2019/0179945 | A1 | 6/2019 | Schouten et al. |
| 2019/0266269 | A1 | 8/2019 | Schouten et al. |
| 2020/0012730 | A1 | 1/2020 | Schouten et al. |
| 2020/0134060 | A1 | 4/2020 | Schouten et al. |
| 2020/0174789 | A1 | 6/2020 | Miller |

OTHER PUBLICATIONS

Douglas et al., "Vectorization, Part 2: Why and What?," Quantifi Solutions, Jun. 22, 2017, retrieved from https://www.quantifisolutions.com/vectorization-part-2-why-and-what, 7 pages.

Douglas et al., "Vectorization, Part 3: Applying Vectorization to CVA Aggregation," Quantifi Solutions, Jul. 10, 2017, retrieved from https://www.quantifisolutions.com/vectorization-part-3-applying-vectorization-to-cva-aggregation, 6 pages.

Martin, "A Vectorized Hash-Join," University of California at Berkeley, May 11, 1996, 17 pages.

Pennington et al., "GloVe: Global Vectors for Word Representation," Stanford University, Aug. 2014, retrieved from http://www-nlp.stanford.edu/projects/glove/, 3 pages.

Teotia, "Columnar Databases and Vectorization," infoQ, May 27, 2018, retrieved from https://www.infoq.com/articles/columnar-databases-and-vectorization/, 18 pages.

Zukowski et al., "MonetDB/X100—A DBMS in the CPUS Cache," IEEE Computer Society Technical Committee on Data Engineering, 2005, 6 pages.

Notice of Allowance for U.S. Appl. No. 15/836,342, dated Oct. 1, 2020, 9 pages.

Official Action for U.S. Appl. No. 15/836,530, dated Dec. 8, 2020, 42 pages.

Official Action for U.S. Appl. No. 15/905,538, dated Oct. 5, 2020, 17 pages.

Official Action for U.S. Appl. No. 16/030,412, dated Sep. 18, 2020, 18 pages.

Official Action for U.S. Appl. No. 16/203,767, dated Nov. 27, 2020, 13 pages.

U.S. Appl. No. 15/836,342, filed Dec. 8, 2017, published as U.S. Pub. No. 2019/0179912.

U.S. Appl. No. 15/836,530, filed Dec. 8, 2017, published as U.S. Pub. No. 2019/0179924.

U.S. Appl. No. 15/836,674, filed Dec. 8, 2017, published as U.S. Pub. No. 2019/0179945.

U.S. Appl. No. 15/905,538, filed Feb. 26, 2018, published as U.S. Pub. No. 2019/0266269.

U.S. Appl. No. 16/030,412, filed Jul. 9, 2018, published as U.S. Pub. No. 2020/0012730.

U.S. Appl. No. 16/173,596, filed Oct. 29, 2018, published as U.S. Pub. No. 2020/0134060.

U.S. Appl. No. 16/203,767, filed Nov. 29, 2018, published as U.S. Pub. No. 2020/0174789.

U.S. Appl. No. 16/459,028, filed Jul. 1, 2019.

U.S. Appl. No. 16/730,076, filed Dec. 30, 2019.

U.S. Appl. No. 16/459,028, Miller.

U.S. Appl. No. 16/730,076, Solari.

"Data Frame," wiki.GIS.com, Date Unknown, Archived Webpage dated May 23, 2010, retrieved from https://web.archive.org/web/20100523091909/http://wiki.gis.com/wiki/index.php/Data_Frame, 4 pages.

"Frames table schema," ArcGIS, Date Unknown, Archived Webpage dated Jan. 8, 2017, retrieved from https://web.archive.org/web/20170108090522/https://desktop.arcgis.com/en/arcmap/latest/manage-data/raster-and-images/frames-table-schema.htm, 4 pages.

Official Action for U.S. Appl. No. 15/836,342, dated Feb. 7, 2020, 10 pages.

Official Action for U.S. Appl. No. 15/836,342, dated May 18, 2020, 14 pages.

Official Action for U.S. Appl. No. 15/836,530, dated May 27, 2020, 32 pages.

Official Action for U.S. Appl. No. 15/836,674, dated Jun. 15, 2020, 23 pages.

Official Action for U.S. Appl. No. 15/905,538, dated May 26, 2020, 16 pages.

Official Action for U.S. Appl. No. 16/030,412, dated May 27, 2020, 13 pages.

Official Action for U.S. Appl. No. 16/173,596, dated Aug. 7, 2020, 9 pages.

Official Action for U.S. Appl. No. 16/203,767, dated Aug. 13, 2020, 9 pages.

* cited by examiner

PROCESSING OF TRANSACTION RECORDS IN A DATABASE BASED ON REASON CODES

FIELD OF THE DISCLOSURE

Embodiments of the present disclosure relate generally to methods and systems for managing transaction records in a database and more particularly to processing transaction records based on applied status codes indicating a reason for a current status of the record.

Figure 1:
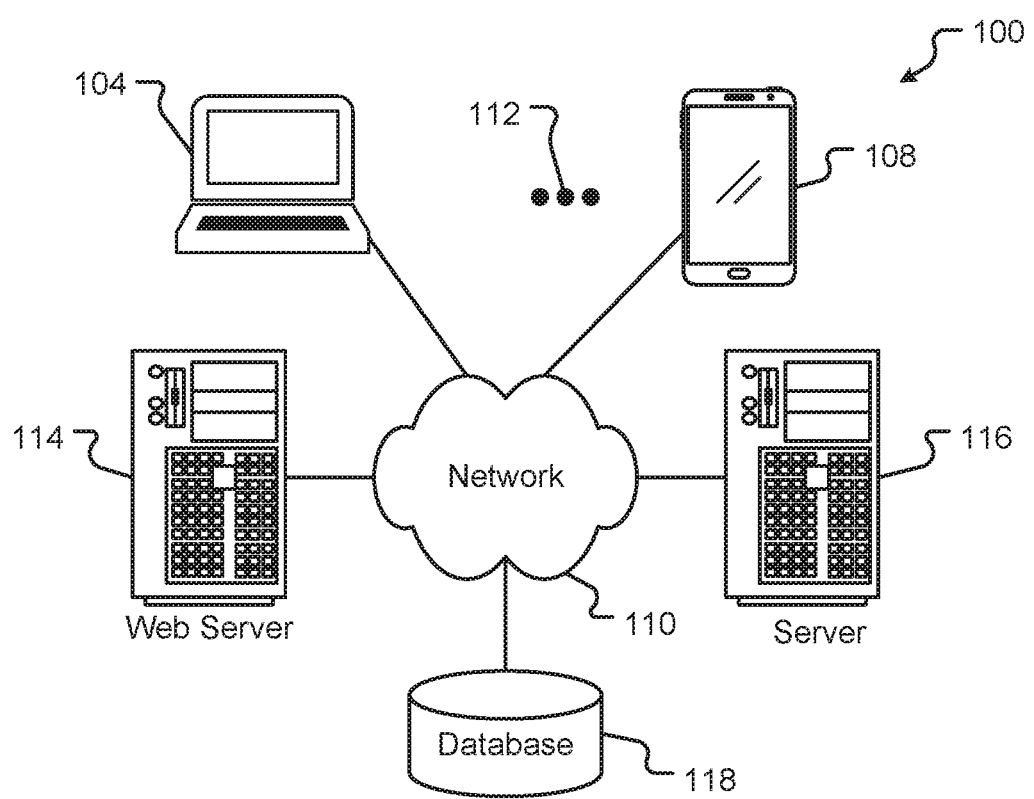
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
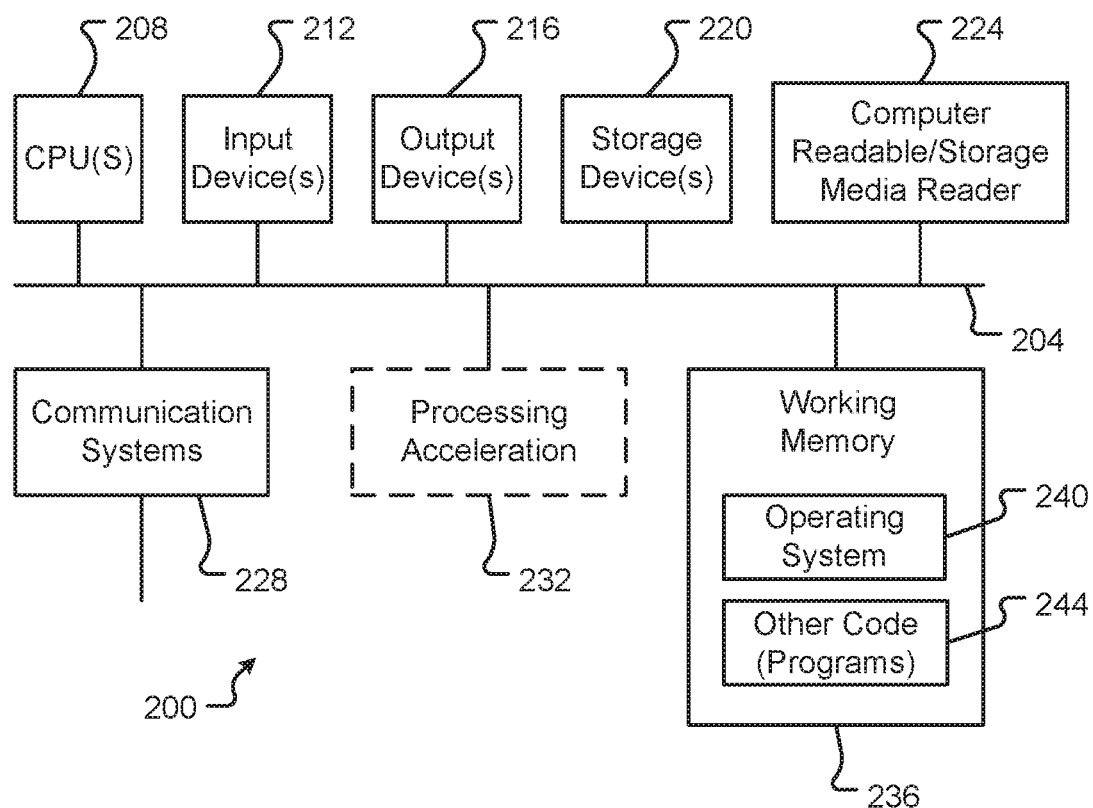
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
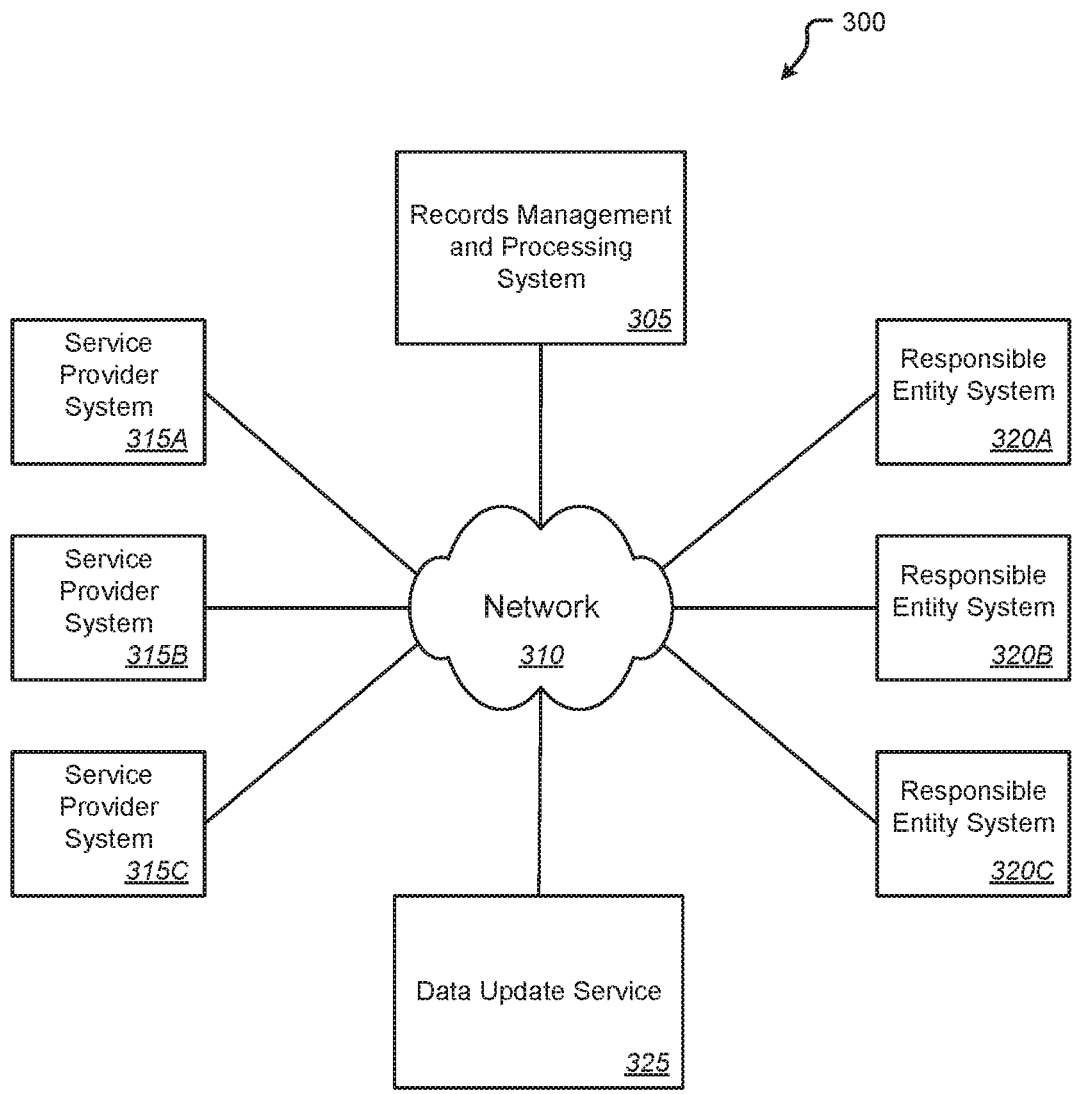
FIG. 3 is a block diagram illustrating an exemplary environment in which a records management and processing system and data collection service can be implemented according to one embodiment of the present disclosure.

FIG. 3 is a block diagram illustrating an exemplary environment in which a records management and processing system and data collection service can be implemented according to one embodiment of the present disclosure. As illustrated in this example, the environment 300 can include a number of different systems. Specifically, the environment 300 can include a records management and processing system 305 which can comprise a server or other computing device as described above. The records management and processing system 305 can be communicatively coupled with a communication network 310 such as the Internet or any other one or more wired or wireless, local or wide area networks. The environment 300 can also include a number of service provider systems 315A-315C each of which can comprise a server or other computing device as described above and which can also be communicatively coupled with the communication network 310. Furthermore, the environment 300 can include a number of responsible entity systems 320A-320C each of which can comprise a server or other computing device as described above and which can also be communicatively coupled with the communication network 310. It should be noted that while three service provider systems 315A-315C and three responsible entity systems 320A-320C are shown here for illustrative purposes, any number of such systems 315A-315C and 320A-320C can be present in various different implementations without departing from the scope of the present disclosure.

According to one implementation, the service provider systems 315A-315C can represent those servers or other computer systems typically associated with an entity providing a service consumer. In one embodiment, the providers of the services can comprise healthcare providers such as hospital, doctors, physical therapists, counsellors, out-patient and/or urgent care facilities, pharmacies, or other such providers while the consumer can comprise a patient. In such embodiments, the responsible party systems 320A-320C can comprise, for example, those servers or other computer systems typically associated with an entity responsible for some duties related to the delivery of and/or payment for those services. For example, responsible parties can include third-party payors including but not limited to insurance companies, Medicare, Medicaid, and/or other private, governmental, or mixed public/private entities. While described here with reference to healthcare providers and third-party payors such as insurance companies, it should be understood that various embodiments of the present disclosure are not limited to such implementations. Rather, embodiments of the present disclosure are believed to be equally adaptable to and useful in environments and systems which process a large volume of electronic records according to complex rules and regulations, business or financial arrangements, etc.

Regardless of the exact implementation of nature of the entities involved, the records management and processing system 305 can comprise an intermediary between a plurality of service providers systems 315A-315C and the plurality of responsible entity systems 320A-320C. As such and as will be described in greater detail below, the records management and processing system 305 can maintain a set of records related to services provided to a consumer by each or the service providers and for which at least one of the responsible entities is responsible in some way, e.g., granting approval, making a payment, providing some additional information, etc. In the normal course of processing such records and such transactions, the records management and processing system 305 may experience a delay in the handling of some records. For example, delays can be caused by data anomalies in records provided to the records management and processing system 305 by the service provider systems 315A-315C. In other cases, delays can be caused by a problem or potential problem with the handling of records or the performance of required actions by the responsible entity systems 320A-320C. In the example of the healthcare implementation described above, the records can represent, at least in part, payments to be made by the responsible entities to the service providers and thus, can represent accounts receivable for the service providers. As such, the timely completion of handling such records can directly impacts the cashflow of the service providers. Additionally, the longer processing of such records is delayed, the more likely the payments will become contested or otherwise become problematic. In other implementations, the timely processing of records by the records management and processing system 305 can be equally important for a variety of other reasons.

Accordingly, embodiments of the present disclosure are directed to methods and systems for the timely processing of records by the records management and processing system 305 exchanged between the service provider systems 315A-315C and the responsible entity systems 320A-320C. More specifically, the records management and processing system 305 can maintain a set of rules defining conditions for processing records and associated actions to affect that processing upon satisfaction of or failure to satisfy the conditions of that rule. The records management and processing system 305 can also maintain tags identifying data in a record, current status of processing of a record, or other information about the record. The records management and processing system 305 can apply the rules to the records and assign tags to the records based on the conditions defined in the applied rules. The records management and processing system 305 can then process the records according to workflows for processing the records based on the assigned tags and applied rules.

Since the records maintained and processed by the records management and processing system 305 relate to transactions or processes that involve actions by one or more of the responsible entity systems 320A-320C, the status of these records can change based on processes performed on those systems 320A-320C. For example, in the healthcare implementation described above, a record may be updated to payment pending or denied based on the execution of a workflow or other process by a responsible entity system 320A-320C. These changes in status can be relevant to the further processing of records by the records management and processing system 305. For example, a change of status for a record to indicate a denial of that payment or transaction may be relevant to trigger an appeal process or workflow which may be subject to a time limit or deadline. On the other hand, a change in status to indicate that a payment pending may require no immediate action but may trigger an action at a later time such as a check or confirmation that the payment has in fact been made. However, these status changes or information updates for the records may not always be communicated from the responsible entity systems 320A-320C to the records management and processing system 305 in a timely or reliable manner.

Therefore, and to further facilitate the timely and efficient processing or records, a data update service 325 may be utilized to obtain from each of the responsible entity systems 320A-320C update information related to the records being maintained and processed by the records management and processing system. More specifically, the data update service 325 can periodically, e.g., daily, weekly, monthly, etc., "crawl" or "scrape" or otherwise access each of the responsible entity systems 320A-320C and collect therefrom information related to records maintained and being processed by the records management and processing system 305. For example, the data update service 325 can access each responsible entity system through a portal or other means using previously issued credentials or other authentication and authorization mechanisms in a manner as can be understood by one skilled in the art. The data update service 325 can comprise, for example, a third-party service, i.e., separate from the other systems 305, 315A-315C and/or 320A-320C and operated by a different entity, and to which the records management and processing system 305 may subscribe or otherwise obtain permission to access and engage. In other cases, the data update service 325 may be integrated into the records management and processing system 305 or even one or more of the responsible entity systems 320A-320C or service provider systems 315A-315C.

Regardless of exactly how or where it is implemented, the records management and processing system 305 can receive update information from the data update service 325 related to the records being processed. The update information provided by the data update service 325 can indicate, for example, a current status of one or more of the records as well as more detailed information obtained from the responsible entity system 320A, 320B, or 320C related to or responsible for that record. Once obtained by the records management and processing system 305, this update information can be used to more efficiently process the relevant records. For example, rather than attempting to process all records maintained therein, the records management and processing system 305 can apply the rules described above to those records for which updates have been received. Based on the applied rules, the updated records can be tagged and further processed accordingly.

In some cases, update information received by the records management and processing system 305 from the data update service may indicate a current status of processing of a particular record or set of records by one or more of the responsible entity systems 320A-320C. For example, in the healthcare implementation introduced above, an update may be received by the records management and processing system 305 from the data update service indicating that a responsible entity system 320A has denied payment on a particular record. In other cases, an update may be received by the records management and processing system 305 directly from one of the responsible entity systems 320A, from one of the service provider systems 315A, through an interface, such as a user interface or in an interface to an application or other system (not shown here) provided by the records management and processing system 305. In any of these cases, embodiments can provide for further processing of the denied transaction record to either confirm the denial or attempt to resolve and potentially reverse the denial.

According to one embodiment, this further processing can comprise applying rules as described above to the update information indicating the current status and/or the corresponding record and executing a selected workflow to process the updated record, or take no further action on the record, as the case may be and according to the rules. In some cases, the rules can define a decision tree used to normalize the data indicating and describing the current status and identify the cause of or reason for the current status. Depending on the path through such a decision tree based on the update information and/or data from the related record an appropriate workflow can be selected and then executed to further process the updated record. For example, and again in the healthcare implementation, the current status may indicate a denial by the responsible entity to pay for a service rendered by one of the service providers, e.g., a hospital or doctor bill. In such cases, the update information can include a denial code indicating the reason. Based on the denial code and/or other information, the selected workflow can, for example, launch an appeals process, collect and submit additional information, resubmit the record, etc.

Figure 4:
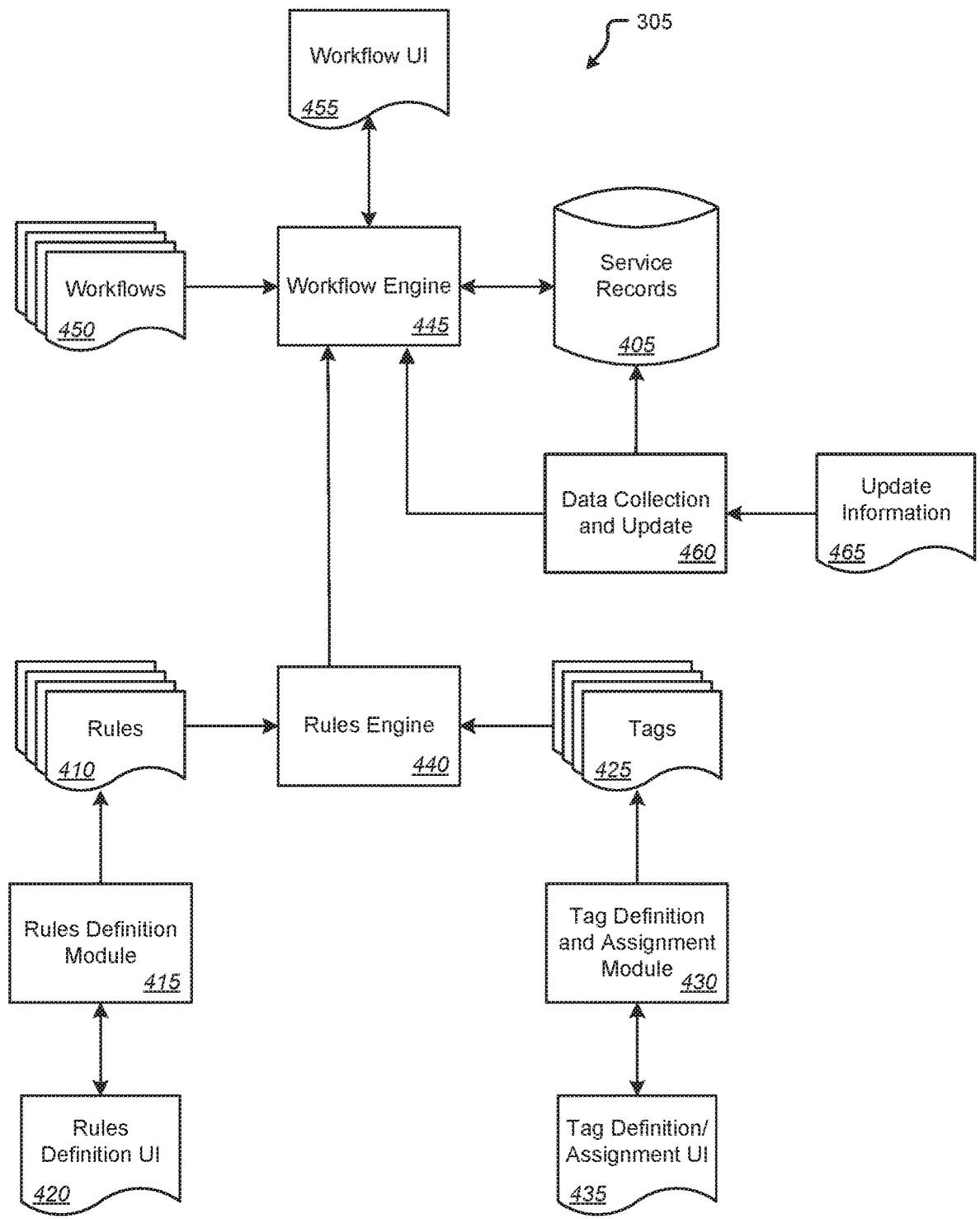
FIG. 4 is a block diagram illustrating elements of an exemplary records management and processing system according to one embodiment of the present disclosure.

FIG. 4 is a block diagram illustrating elements of an exemplary records management and processing system according to one embodiment of the present disclosure. As illustrated in this example, the records management and processing system 305 as described above can comprise a set of records maintained in a database 405 or other repository. As noted above, each record of the set of records in the database can comprise a record of a service provided to a consumer by a service provider and can identify at least one required action by at least one responsible entity of a plurality of responsible entities. Also, as described above, the records management and processing system 305 can comprise an intermediary between systems of the plurality of service providers and systems of the plurality of responsible entities.

The records management and processing system 305 can also maintain one or more rules 410 for managing and processing the records of the database 405. Generally speaking, a rule can comprise a definition of one or more conditions and an associated one or more actions to be performed upon satisfaction, or failure to satisfy, the conditions of that rule. Accordingly, each rule 410 maintained by the records management and processing system 305 can comprise one or more conditions for processing one or more records of the set of records 405 and at least one associated action to affect processing of the one or more records upon satisfaction of or failure to satisfy the one or more conditions of the rule 410. The conditions defined in some of these rules 410 can comprise conditions to be satisfied by one or more of the responsible entities 320A-320C described above. For example, one or more rules can define timing or other conditions a payment by a third-party payor, e.g., Medicare, Medicaid, an insurance company, etc., for a service rendered by the service provider, e.g., a hospital, doctor, pharmacy, etc., to the consumer/patient. Additionally, or alternatively, conditions defined in some of the rules 410 can define parameters for data in the record. For example, rules 410 can be defined for performing checks on the values of various fields of data in the records 405 such as comparing different fields, e.g., a value of total charges relative to a value of total adjustments, etc.

To facilitate definition of the rules 410, the records management and processing system 305 can further comprise a rules definition module 415. Generally speaking, the rules definition module 415 can comprise one or more applications executed by the records management and processing system 305 and which provide a rules definition interface 420. The rules definition interface 420 can include, for example, one or more webpages or other, similar interfaces providing elements through which an authorized user, such as an administrator or manager, can select or otherwise input conditions and corresponding actions for a new or modified rule. Once defined in this manner, the new or modified rule can be saved in the set of rules 410 and made available for application by the records management and processing system 305.

The records management and processing system 305 can also maintain a set of tags 425 for managing and processing the records 405. Generally speaking, these tags 425 can comprise a flag, metadata, or other information used to describe, explain, mark, or otherwise identify records in the set of records 405. For example, the tags 425 can include, but are not limited to, tags used to identify data in a record 405, a current status of processing of the record 405, or other information about the record. As will be described, these tags 425 can be used to identify records 405 that merit additional attention and/or processing and thus, the absence of tags associated with a record can implicitly indicate that additional attention or handling is not needed for that record.

To facilitate definition and use of the tags 425, the records management and processing system 305 can further comprise a tag definition and assignment module 430. Generally speaking, the tag definition and assignment module 430 can comprise one or more applications executed by the records management and processing system 305 and which provide a tag definition and assignment interface 435. The tag definition and assignment interface 435 can include, for example, one or more webpages or other, similar interfaces providing elements through which an authorized user, such as an administrator or manager, can select or otherwise input definitions of new or modified tags. Once defined in this manner, the new or modified tag can be saved in the set of tags 430 and made available for application by the records management and processing system 305.

The records management and processing system 305 can also comprise a rules engine 440. Generally speaking, the rules engine can comprise one or more applications executed by the records management and processing system 305 and which can read and apply the rules 410 to the records 405. That is, the rules engine 440 can compare the records stored in the database 405 to the conditions for the rules 410 and, upon finding records that satisfy, or fail to satisfy as the case may be and depending upon how the condition is defined, can perform or cause to be performed the action associated with the satisfied or failed condition. These actions can include, for example, applying one or more of the tags 425 to the identified records 405 or presenting the identified records to a user and receiving an indication of the tag(s) to be applied. The tag(s) 425 applied to a record can identify or mark that record for further attention to advance the processing of that record. Thus, records that are not tagged do not require additional attention or processing outside of normal processes since they are in a condition as defined in the rules as being normal or acceptable, e.g., within defined deadlines or other time limits etc. In other words, processing can be applied to one set of records based on the tags applied while processing of another set of records can be postponed or delayed so that the first set of records can be given more attention and resources.

The rules engine 440 can apply the rules 410 to the records 405 periodically, on demand, or upon the occurrence of predefined event or the satisfaction of one or more predefined conditions. For example, the rules engine 440 can apply the rules 410 as part of a routine process performed each day, week, month, or other period, and/or may be initiated or kicked off upon request by an authorized user of the system such as a manager or supervisor. As noted above, applying the rules 410 can include tagging one or more records based on the applied rules 410. Additionally, or alternatively, tags can be applied to one or more records based on a user selection or input. For example, a user viewing a set of records can select records from that set and apply one or more tags to those selected records based on conditions the user perceives and which may or may not be defined in the rules. Thus, tagging of records can be driven by the applied rules or based on input from a user and the tags applied in either way can influence the further handling of those tagged records.

According to one embodiment and as illustrated here, the records management and processing system 305 can also comprise a workflow engine 445 and a set of predefined workflows 450. Generally speaking, a workflow 450 can comprise a set of one or more steps to be performed on or related to a record. These steps can be wholly machine executable or may, in some cases, rely on some degree of human intervention. For example, these steps can range from presenting data from a tagged record in a user interface to a human operator, such as a collector, for an action to be performed by the operator, e.g., calling a payor or performing some other follow-up action, to a completely automated process such as sending an automatically generated communication to a payor system or combinations of various such human and machine actions. The workflow engine 445 can comprise one or more applications executed by the records management and processing system 305 and which, during execution, can read the predefined workflows 450 and implement or perform the steps defined therein. The workflows 450 can comprise a set of predefined, executable steps directed to advancing the processing of the records 405 identified by the rules 405 and tagged as described above. The workflow engine 445 can execute the workflows 450 by selecting a workflow 450 based on the tags 425 for a record 405 and executing the selected workflow 450 using the information from that record and, in some cases, based on further application of one or more rules 410 related to the tags 425 applied to that record 405. Thus, the conditions and associated actions defined in the rules 410 can also be applied by the workflow engine 445 as it executes the workflows 450. The workflow engine 445 can also provide a workflow user interface 450 for viewing and managing one or more workflows for processing records.

Therefore, the rules engine 440 can apply one or more of the rules 410 to the records saved in the database 405 to identify those records which should be further processed or given further scrutiny and mark those records with one or more tags 425. In this way, those records found to be within normal or acceptable conditions according to the applied rules need not be subjected to further scrutiny and/or processing thus saving resources such as human effort, processing overhead, etc. In other words, processing of one set of records can be performed in an expedited or priority manner while processing of another set of records can be de-prioritized or postponed based on the tags applied to the records which is in turn based on the rules or input from a user.

One or more predefined workflow processes 450 can then be selected, e.g., based on the applied tags, initiated, and executed by the workflow engine 445 to further process those tagged records. The workflows 450 can be initiated automatically, e.g., triggered by the rules engine 445 upon completion of applying the tags 425, upon the occurrence of certain conditions, e.g., as defined in one or more rules 410, at a predetermined or pre-scheduled time, upon request, or in a variety of other ways without departing from the scope of the present disclosure. Processing the tagged records 405 by the workflow engine 445 can comprise performing the steps defined in the workflows 450, which can include applying the selected or additional rules 410 to the records being processed, in order to advance the handling of those records 405 by the records management and processing system 305, e.g., move an account towards payment or other resolution. Additional details of processing the records 405 by the workflow engine 445 based on the applied rules 410 and tags 425 according to various embodiments of the present disclosure will be described below.

As noted above, to further facilitate this processing of records, a data update service 325 may be utilized to obtain from each of the responsible entity systems 320A-320C update information 465 related to the records 405 being maintained and processed by the records management and processing system 305. Accordingly, the records management and processing system 305 can further include a data collection and update module 460 for interfacing with the data update service 325, receiving update information 465 therefrom, correlating that update information 465 with one or more records 405, and facilitating the further processing of those records 405 by the workflow engine 445 as described above.

More specifically, a set of update information 465 related to one or more of the records 405 can be received by the data collection and update module 460 of the records management and processing system 305 from a data update service 325. According to one embodiment, the received update information 465 can comprise a status indicator for each updated record determined by the data update service 325 and indicating the current status for the updated record. Additionally, or alternatively, the update information can comprise a set of one or more images for each updated record. Each image of the set of one or more images can represent a user interface from one of the systems of the plurality of responsible entity systems 320A-320C and presenting information related to the updated record. That is, the update information can include, at least in part, one or more screenshots of a webpage or other interface presented by the responsible entity system from which the update information is obtained by the data update service. This screenshot or image can be captured when the webpage or interface is presenting or displaying details of the updated record, e.g., contents of the record, explanations or indications of the changes, etc.

Once the update information 465 has been received, the data collection and update module 460 can determine or identify which of the maintained records 405 the update information affects. In other words, the received update information 465 can be correlated by the data collection and update module 460 to one or more of the maintained of records 405. This correlation can comprise, for example, saving the update information 465 in the record(s) 405 to which it relates, linking or mapping the update information 465 to the related record(s) 405, or otherwise indicating which records 405 the update information 465 or portions thereof relate.

Once the rules 410 and tags 425 have been defined and the update information 465 has been received and correlated to the records 405, one or more rules 410 can be applied by the rules engine 440 and one or more tags can be assigned to the updated records based on the conditions defined in the rules applied by the rules engine 440. According to one embodiment, and as noted above, assigning tags to one or more updated records can additionally or alternatively comprise receiving an input from a user indicating a selected one or more updated records and an indication of one or more tags to be applied to the selected updated records and saving the indicated tags associated with the selected updated records. Thus, assigning tags to one or more updated records can be driven by the applied rules or can be based on input from a user.

After the rules have been applied and the updated records have been tagged, the tagged updated records can be processed by the workflow engine 445 according to one or more workflows 450 as described above. That is, once updated records which should be addressed have been locating by applying the rules and those records have been identified by applying tags to them to indicate the processing to be performed, etc., one or more predefined workflow 450 processes can be initiated by the workflow engine 445 to further process those marked/tagged updated records or expedite the processing of those records. Conversely, processing of those records identified as not meriting additional or expedited processing, even if an update for that record has been received, can be de-prioritized or postponed while resources are dedicated to handling of the first set of update records.

For example, the rules engine 440 and workflow engine 445 can process the updated records by identifying a change in each updated record from a previous status for that record. Once this change has been identified, the updated records can be processed by the workflow engine 445 according to the one or more of the workflows 450 and based on the change or type of change identified. For example, a record being processed by a responsible entity and which has been updated to a denied, declined, refused, or similar status can be processed under one workflow 450 while records indicated as pending and in need of additional information or processing can receive a different handling under a different workflow 450. In some cases, processing the one or more records according to the one or more workflows can comprises assigning, by the workflow and perhaps based on one or more applied rules, a deadline for performing the actions directed to furthering the processing of the record, e.g., to schedule further actions, define performance metrics, trigger the generation of alarms and/or reports on or after the deadline and if processing of the record has not been completed, etc. Other processes performed by the workflow engine 445 based on the workflows 450 and/or rules 410 can include but are not limited to prioritizing and/or de-prioritizing the processing of certain updated records based on the type of update received, information in the record, etc., ranking or ordering the processing of records at different priority levels, presenting details of record information and update information for that record in a user interface, etc.

As introduced above, update information 465 received by the data collection and update module 460 of the records management and processing system 305 may, in some cases, indicate a current status of processing of a particular record or set of records by one or more of the responsible entity systems 320A-320C. For example, update information 465 may be received by the records management and processing system 305 indicating that a responsible entity system 320A has denied payment on a particular record. As described above, such update information 465 may be received from the data update service 325. Additionally, or alternatively, update information 465 may be received by the data collection and update module 460 of the records management and processing system 305 directly from one of the responsible entity systems 320A or from one of the service provider systems 315A. In yet other cases, update information 465 can additionally or alternatively be received through an interface (not shown here), such as a user interface or in an interface to an application or other system (not shown here) provided by the data collection and update module 460 of the records management and processing system 305. In any of these cases, the data collection and update module 460 can locate and retrieve the updated record(s) 405 and the rules engine 440 and workflow engine 445 can further process the updated records to either confirm the current status or attempt to resolve and potentially change the current status if necessary and/or possible.

More specifically, the rules engine 440 and workflow engine 445 can process the updated records as described above. In some cases, the rules 410 applied by the rules engine 440 can define one or more decision trees. Since the update information 465 may come from a variety of sources and since these different sources may not be consistent in how reason codes and other update information 465 is assigned or generated, the update information 465 can be selectively processed according to one or more of the decision trees to normalize the data in the update information 465 indicating and describing the current status and identify the cause of or reason for the current status. For example, update information from certain one or more responsible entity systems may be known to be in a proper form, e.g., the reason codes are properly applied and other information in the update is known to be reliable. In these cases, normalization of the update information does not need to include the application of a decision tree to those records. In other cases, one or more decision trees can be defined for each of one or more responsible entity systems based on the known or learned manner in which each of those systems process records, define a current status, apply reason codes, etc. In such cases, normalizing the data can comprise selecting one or more decision trees to be applied based on which responsible entity system is providing the update.

As will be described in greater detail below, each decision tree can comprise one or more branch nodes. Each branch node can represent a decision, i.e., defined by the conditions and actions of the applied rule 410. The decision tree can also comprise a plurality of leaf nodes. Each leaf node can represent a workflow 450 to be initiated. As the rules engine 440 applies the rules 410 defining the decision tree to the update information 465 and related record 405, the series of decisions made at each decision node causes the rules engine 440 to navigate or traverse the tree until a leaf node is reached.

Upon reaching the leaf node, an appropriate workflow 450 can be selected and executed by the workflow engine 445 to further process the updated record. For example, and again in the healthcare implementation, the update information 465 may indicate a denial by the responsible entity to pay for a service rendered by one of the service providers, e.g., a hospital or doctor bill. In such cases, the update information 465 can include a denial code indicating the reason. Based on the denial code and/or other information, the selected workflow 450 executed by the workflow engine 445 can, for example, cause the records management and processing system 305 to launch an appeals process, collect and submit additional information, resubmit the record, etc. As part of these processes, the records management and processing system 305 generate and send communications to one or more service provider systems 315A-315C, responsible entity systems 320A-320C, and/or others. For example, the workflow engine 445 can, based on the selected and executed workflow 450 and any applied rules 410, generate letters, documents, requests, etc. to provide request and/or initiate an appeal process of the appropriate responsible entity system, provide notice of the denial and appeal, if any, a service provider system or customer, and/or request additional information from a service provider system or customer, etc.

Figure 5:
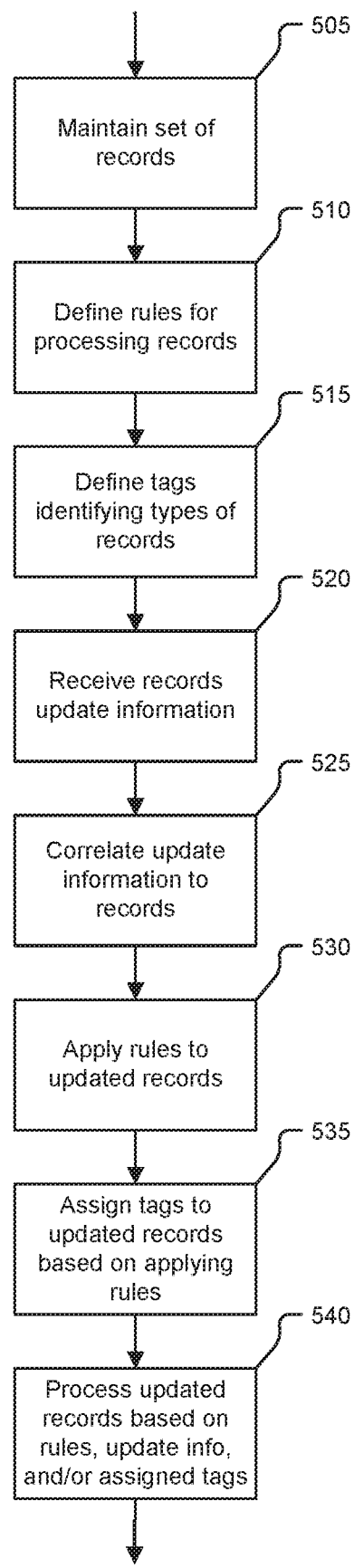
FIG. 5 is a flowchart illustrating an exemplary process for adapting workflows to process database records based on a set of rules and update information related to the records according to one embodiment of the present disclosure.

FIG. 5 is a flowchart illustrating an exemplary process for adapting workflows to process database records based on a set of rules and update information related to the records according to one embodiment of the present disclosure. As illustrated in this example, managing and processing database records can comprise maintaining 505 a set of records in a database. Each record of the set of records can comprise a record of a service provided to a consumer by a service provider of a plurality of service providers and can identify at least one required action by at least one responsible entity of a plurality of responsible entities. As described above, the system managing and processing the database records can comprise an intermediary between systems of the plurality of service providers and systems of the plurality of responsible entities.

One or more rules can be defined 510 for managing and processing the records. Each rule can comprise one or more conditions for processing one or more records of the set of records and at least one associated action to affect processing of the one or more records upon satisfaction of or failure to satisfy the one or more conditions of the rule. In some cases, the one or more conditions defined in at least one rule can comprise conditions to be satisfied in the processing of the record, e.g., a due date, an allowable time since a last action, etc. Additionally, or alternatively, the one or more conditions defined in at least one rule can define or identify data in the record provided by the service provider. For example, one or more rules can define checks to be performed on various fields of data in the record provided by the service providers such as defining proper form and/or content for descriptions, comparing different fields such as total charges relative to total adjustments, etc.

A plurality of tags can also be defined 515 for managing and processing the records. Each tag of the plurality of tags can comprise information identifying data in a record, current status of processing of a record, or other information about a record of the plurality of records. That is, each tag can comprise a flag, metadata, or other information to be added to or associated with a record to indicate a status or state of the data or a status or state of processing the record that merits additional attention and/or processing, e.g., a condition or result has occurred while processing a given record that is defined by a rule or rules as indicating an exception or condition with the record or the processing of that record that merits additional attention or further handling. By doing so, those records that are not tagged can be implicitly identified as not requiring further attention or handling and therefore, the processing of those records can be de-prioritized or postponed while resources are dedicated to processing or the records that do merit additional attention or further handling.

A set of update information related to the plurality of records can be received 520 from a data update service. The update information can be collected by the data update service from the systems of the plurality of responsible entities. According to one embodiment, the received update information can comprise a status indicator for each updated record determined by the data update service and indicating the current status for the updated record. Additionally, or alternatively, the update information can comprise a set of one or more images for each updated record. Each image of the set of one or more images can represent a user interface from one of the systems of the plurality of responsible entities and presenting information related to the updated record. That is, the update information can include, at least in part, one or more screenshots of a webpage or other interface presented by the responsible entity system from which the update information is obtained by the data update service. This screenshot or image can be captured when the webpage or interface is presenting or displaying details of the updated record, e.g., contents of the record, explanations or indications of the changes, etc. Receiving 520 the update information can be performed periodically, on demand, or upon the occurrence of predefined event or the satisfaction of one or more predefined conditions. For example, receiving 520 the update information can be performed as part of a routine process performed by the data update service or records management and processing system each day, week, month, or other period, and/or may be initiated or kicked off upon request by an authorized user of the system such as a manager or supervisor. Other implementations of how and when the update information can be provided and received 520 are contemplated and considered to be within the scope of the present disclosure.

The received 520 update information can be correlated 525 to one or more records of the plurality of records. The one or more records of the plurality of records to which the update information is correlated can comprise updated record. Correlating 525 the update information to the records can comprise, for example, saving the update information in the record(s) to which it relates, linking or mapping the update information to the related record(s), or otherwise indicating which records the update information or portions thereof relate.

Once the rules and tags have been defined 510 and 515 and the update information has been received 520 and correlated to the records, the one or more rules can be applied 530 and one or more tags of the plurality of tags can be assigned 535 to the updated records based on the conditions defined in the applied 530 one or more rules. That is, each updated record can be checked against the conditions defined in the rules and an appropriate tag can be assigned to one or more of the updated records according to those rules and the record's satisfaction of or failure to satisfy the conditions. Applying 530 the rules can be performed periodically, on demand, or upon the occurrence of predefined event or the satisfaction of one or more predefined conditions. For example, applying 530 the rules can be performed as part of a routine process performed each day, week, month, or other period, and/or may be initiated or kicked off upon request by an authorized user of the system such as a manager or supervisor. Other implementations of how and when the rules application 530 can be initiated are contemplated and considered to be within the scope of the present disclosure. According to one embodiment, assigning 535 tags to one or more updated records can additionally or alternatively comprise receiving an input from a user indicating a selected one or more updated records and an indication of one or more tags to be applied to the selected updated records and saving the indicated tags associated with the selected updated records. Thus, assigning 535 tags to one or more updated records can be driven by the applied 530 rules or can be based on input from a user.

After the rules have been applied 530 and the records have been tagged 535, the one or more tagged updated records can be processed 540 according to one or more workflows. The one or more workflows can process the updated and tagged records based on the received 520 update information and actions defined in the applied 530 one or more rules associated with conditions satisfied by the one or more records. That is, once updated records which should be addressed have been locating by applying 530 the rules and those records have been identified by applying 535 tags to them to indicate the processing to be performed, etc., one or more predefined workflow processes can be initiated to further process 540 those marked/tagged updated records or expedite the processing of those records. Conversely, processing of those records identified as not meriting additional or expedited processing, even if an update for that record has been received, can be de-prioritized or postponed while resources are dedicated to handling of the first set of update records.

The workflows can be initiated automatically upon completion of applying 535 the tags, upon the occurrence of certain conditions, e.g., as defined in one or more rules, at a predetermined or pre-scheduled time, upon request, or in a variety of other ways without departing from the scope of the present disclosure. The workflows can comprise a set of predefined, executable steps directed to correcting the potential problems in the handling of the updated records identified by the rules or otherwise facilitating and/or expediting the further processing of those records. The steps defined in each workflow can comprise a set of automatic, machine executed steps and/or steps relying on some degree of human interaction. Executing the workflows can comprise selecting a workflow based on the tags for an updated record and executing the selected workflow using the information from that record and/or correlated update information and, in some cases, based on further application of one or more rules related to the tags applied to that record. Thus, the conditions and associated actions defined in the rules can also be applied by the workflow as it executes.

For example, and as noted above, applying 530 the one or more rules can comprise determining the defined conditions for the data of at least one record provided by the service provider are not satisfied. In such cases, applying 535 at least one tag to the at least one record can comprise applying a tag that identifies this condition. Processing 540 the one or more records can then comprise executing steps defined in a workflow related or directed to a handling this condition. In some cases, the workflow can further apply the related rule, i.e., the one applied 530 and which identified the condition, to perform actions defined therein and directed to further handling of the record.

According to one embodiment, processing 540 the updated records can comprise identifying a change in each updated record based at least in part on a previous status for each updated record and the current status for each updated record. Once identified, the updated records can be processed according to the one or more workflows based on the change or type of change identified. For example, a record being processed by a responsible entity and which has been updated to a denied, declined, refused, or similar status can receive on handling process whereas records indicated as pending and in need of additional information or processing can receive a different handling. In some cases, processing 540 the one or more records according to the one or more workflows can comprises assigning, by the workflow and perhaps based on one or more applied rules, a deadline for performing the actions directed to furthering the processing of the record. This deadline can be assigned, for example, in absolute terms as a particular date and/or time or in relative terms as an amount of time from initiation of the processing or the record. This deadline can be used, for example, to schedule further actions, define performance metrics, trigger the generation of alarms and/or reports on or after the deadline and if processing of the record has not been completed, or in a variety of other ways contemplated to be within the scope of the present disclosure.

Additionally, or alternatively, processing 540 the updated records according to the one or more workflows can comprises assigning, by the workflow and perhaps based on one or more rules, a priority level to processing of the updated records. So, for example, the applied rules can identify conditions for processing of the records such as due dates, time since last handling or the record, etc. Based on the conditions or the applied rule(s), the rule(s) can indicate a level, i.e., a severity or significance relative to other records. Similarly, in some cases, records having a same assigned priority level can then be ranked by the workflow based on the one or more rules. This ranking may be based, for example, on the data of the record itself such as a dollar amount due, an amount of time the record has been pending, an expected relative ease or difficulty to resolve the identified anomaly or potential problem, etc. According to one embodiment, assigning the priority level to the processing of the updated records based on the one or more applied rules can comprise de-prioritizing processing of one or more updated records satisfying the conditions of the applied rules. De-prioritizing the processing of the one or more updated records can comprise delaying or postponing the processing of the one or more records, hiding the one or more records from view in a user interface presenting records for processing, or rerouting the record to another collector and/or automated process, etc. Once assigned, these levels and rankings, if any, can be used by the workflow, for example, to schedule processing of the records, assigned due dates, generate reports, etc.

As noted above, the received 520 update information can comprise, in some cases, a set of one or more images for each updated record. Each image of the set of one or more images can represent a user interface from one of the systems of the plurality of responsible entities and presenting information related to the updated record. In such cases, processing 540 the updated records can further comprise providing access to the set of one or more images for each updated record through a user interface of the records management and processing system. For example, in the course of processing the updated records, screenshots or similar received images from the responsible entity system(s) can be made available for review through a user interface presented to a human user in order to provide additional insight into the status of the records and facilitate further processing thereof. Other variations are contemplated and considered to be within the scope of the present disclosure.

Figure 6:
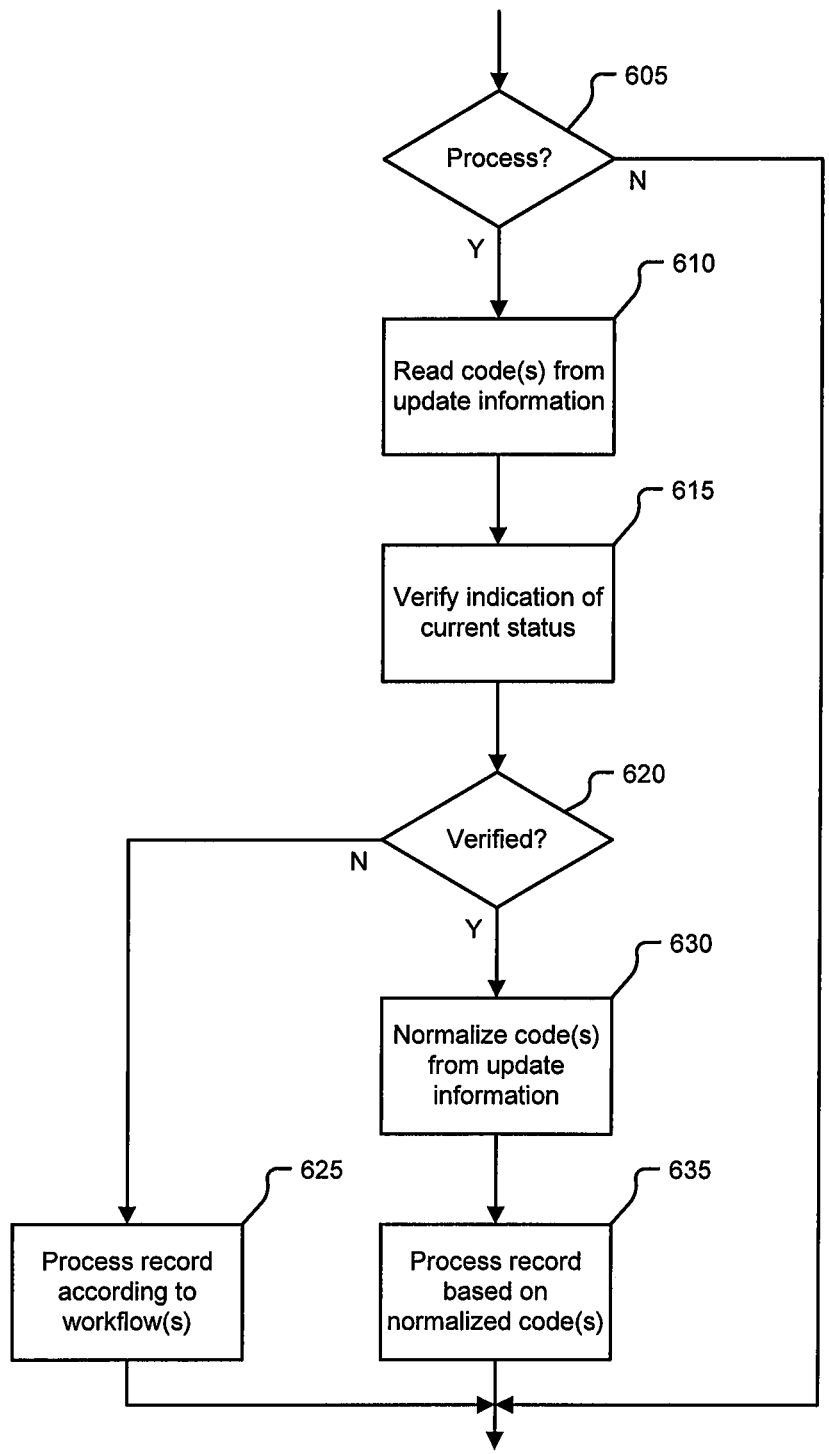
FIG. 6 is a flowchart illustrating an exemplary process for handling transaction records according to one embodiment of the present disclosure.

FIG. 6 is a flowchart illustrating an exemplary process for handling transaction records according to one embodiment of the present disclosure. As introduced above, processing an updated transaction record in a database can comprise maintaining 505 a plurality of records in a database. As described in detail above, each record of the plurality of records can comprise a record of a service provided to a consumer by a service provider of a plurality of service providers and identifying at least one required action by at least one responsible entity of a plurality of responsible entities. Also, as described above, a set of update information related to at least one record of the plurality of records can be received 520. As noted, the update information can comprise information indicating a current status of processing of the at least one record by one or more of the systems of the plurality of service providers and information indicating a reason for the current status.

As illustrated here, processing an updated transaction record can further comprise determining 605 to process the at least one record of the plurality of records based on the information indicating the current status of processing of the at least one record from the set of update information. In response to determining 605 to process the record based on the indication of the current status, the information indicating the reason for the current status can be read 610 from the received update information. Prior to further processing of the record and/or the update information, the information indicating the current status of processing of the at least one record can be verified 615. In response to determining 620 the information indicating the current status of processing is not verified or valid, the at least one record can be processed 625 according to a workflow. For example, processing 625 the at least one record according to the workflow can comprise initiating an appeal process on a record indicating a denial or payment by a responsible entity.

In response to determining 620 the information indicating the current status of processing is verified or valid, the information indicating the reason for the current status from the update information can be normalized 630. The at least one denied record can then be processed 630 based on the normalized information indicating the reason for the current status and according to one or more workflows. The one or more workflows can process the at least one updated record based on the received update information and actions defined in one or more predefined rules.

Figure 7:
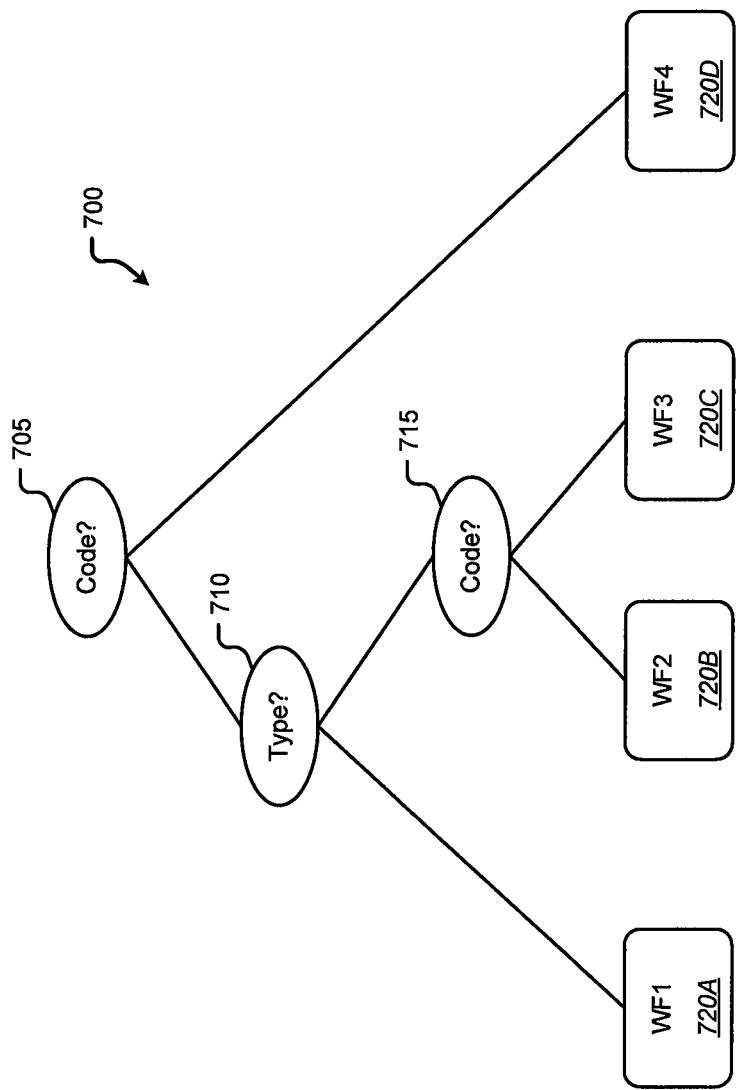
FIG. 7 illustrates an exemplary decision tree as may be used to normalize and process transaction records according to one embodiment of the present disclosure.

FIG. 7 illustrates an exemplary decision tree as may be used to process transaction records according to one embodiment of the present disclosure. According to one embodiment, normalizing 630 the information indicating the reason for the current status and processing 630 the at least one record based on the normalized information indicating the reason for the current status and according to one or more workflows can comprise selectively applying a decision tree 700. As noted above, update information from certain one or more responsible entity systems may be known to be in a proper form, e.g., the reason codes are properly applied and other information in the update is known to be reliable. In these cases, normalization of the update information does not need to include the application of a decision tree to those records. In other cases, one or more decision trees can be defined for each of one or more responsible entity systems based on the known or learned manner in which each of those systems process records, define a current status, apply reason codes, etc. In such cases, normalizing the data can comprise selecting one or more decision trees to be applied based on which responsible entity system is providing the update.

As illustrated here, each decision tree 700 can comprise one or more branch nodes 705, 710, and 715. Each branch node 705, 710, and 715 can represent a decision. The decision tree 700 can also comprise a plurality of leaf nodes 720A-720D. Each leaf node 720A-720D can represent a workflow. For example, the decision tree comprises at least one branch node 705 representing a decision based on the information indicating the reason for the current status such as, for example, a denial code. Additionally, or alternatively, the decision tree 700 can comprise at least one branch node 710 representing a decision based on information from the at least one record such as, for example, a transaction type. By beginning at the root node 705 of the tree and traversing down the tree 700 through the decision nodes 705, 710, and 715, the data can be normalized and, once a leaf node 720A is reached, the record can be processed according to the workflow represented by that node 720A.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing transaction records in a database, the method comprising:

maintaining, by a records management and processing system, a plurality of records in a database, each record of the plurality of records comprising a record of a health care service provided to a consumer by a health care service provider of a plurality of health care service providers and identifying at least one required action by at least one responsible entity of a plurality of responsible entities, wherein each responsible entity comprises a third-party payor for health care services and wherein the records management and processing system comprises an intermediary between systems of the plurality of service providers and systems of the plurality of responsible entities;

receiving, by the records management and processing system, a set of update information related to at least one record of the plurality of records, wherein the update information comprises information indicating a current status of processing of the at least one record by one or more of the systems of the plurality of service providers and information indicating a reason for the current status by the one or more of the systems of the plurality of service providers;

determining, by the records management and processing system, to process the at least one record of the plurality of records based on the information indicating the current status of processing of the at least one record from the set of update information;

reading, by the records management and processing system, the information indicating the reason for the current status of the at least one record from the received update information;

normalizing, by the records management and processing system, the information indicating the reason for the current status from the update information; and processing, by the records management and processing system, the at least one record based on the normalized information indicating the reason for the current status and according to one or more workflows executed by the records management and processing system, wherein the one or more workflows process the at least one record based on the received update information and actions defined in one or more predefined rules.

2. The method of claim 1, further comprising, prior to normalizing the information indicating the reason for the current status from the update information, verifying the information indicating the current status of processing of the at least one record and wherein normalizing the information indicating the reason for the current status and processing the at least one record are performed in response to determining the information indicating the current status of processing is valid.

3. The method of claim 2, further comprising, in response to determining the information indicating the current status of processing is not valid, processing the at least one record according to a workflow executed by the records management and processing system.

4. The method of claim 3, wherein processing the at least one record according to the workflow comprises initiating an appeal process.

5. The method of claim 1, wherein normalizing the information indicating the reason for the current status and processing the at least one record based on the normalized information indicating the reason for the current status and according to one or more workflows comprises applying a decision tree, wherein the decision tree comprises one or more branch nodes, each branch node representing a decision, and a plurality of leaf nodes, each leaf node representing a workflow.

6. The method of claim 5, wherein the decision tree comprises at least one branch node representing a decision based on the information indicating the reason for the current status.

7. The method of claim 5, wherein the decision tree comprises at least one branch node representing a decision based on information from the at least one record.

8. A system comprising:
a processor; and
a memory coupled with and readable by the processor and storing therein a set of instructions which, when executed by the processor, causes the processor to process a denied transaction record in a database by:
maintaining a plurality of records in a database, each record of the plurality of records comprising a record of a health care service provided to a consumer by a health care service provider of a plurality of health care service providers and identifying at least one required action by at least one responsible entity of a plurality of responsible entities, wherein each responsible entity comprises a third-party payor for health care services and wherein the records management and processing system comprises an intermediary between systems of the plurality of service providers and systems of the plurality of responsible entities;
receiving a set of update information related to at least one record of the plurality of records, wherein the update information comprises information indicating a current status of processing of the at least one record by one or more of the systems of the plurality of service providers and information indicating a reason for the current status by the one or more of the systems of the plurality of service providers;
determining to process the at least one record of the plurality of records based on the information indicating the current status of processing of the at least one record from the set of update information;
reading the information indicating the reason for the current status of the at least one record from the received update information;
normalizing the information indicating the reason for the current status from the update information; and
processing the at least one record based on the normalized information indicating the reason for the current status and according to one or more workflows executed by the records management and processing system, wherein the one or more workflows process the at least one record based on the received update information and actions defined in one or more predefined rules.

9. The system of claim 8, further comprising, prior to normalizing the information indicating the reason for the current status from the update information, verifying the information indicating the current status of processing of the at least one record and wherein normalizing the information indicating the reason for the current status and processing the at least one record are performed in response to determining the information indicating the current status of processing is valid.

10. The system of claim 9, further comprising, in response to determining the information indicating the current status of processing is not valid, processing the at least one record according to a workflow executed by the records management and processing system.

11. The system of claim 10, wherein processing the at least one record according to the workflow comprises initiating an appeal process.

12. The system of claim 8, wherein normalizing the information indicating the reason for the current status and processing the at least one record based on the normalized information indicating the reason for the current status and according to one or more workflows comprises applying a decision tree, wherein the decision tree comprises one or more branch nodes, each branch node representing a decision, and a plurality of leaf nodes, each leaf node representing a workflow.

13. The system of claim 12, wherein the decision tree comprises at least one branch node representing a decision based on the information indicating the reason for the current status.

14. The system of claim 13, wherein the decision tree further comprises at least one branch node representing a decision based on information from the at least one record.

15. A non-transitory, computer-readable medium comprising a set of instructions stored therein which, when executed by a processor, causes the processor to process a denied transaction record in a database by:
maintaining, by a records management and processing system, a plurality of records in a database, each record of the plurality of records comprising a record of a health care service provided to a consumer by a health care service provider of a plurality of health care service providers and identifying at least one required action by at least one responsible entity of a plurality of responsible entities, wherein each responsible entity comprises a third-party payor for health care services and wherein the records management and processing system comprises an intermediary between systems of the plurality of service providers and systems of the plurality of responsible entities;

receiving, by the records management and processing system, a set of update information related to at least one record of the plurality of records, wherein the update information comprises information indicating a current status of processing of the at least one record by one or more of the systems of the plurality of service providers and information indicating a reason for the current status by the one or more of the systems of the plurality of service providers;

determining, by the records management and processing system, to process the at least one record of the plurality of records based on the information indicating the current status of processing of the at least one record from the set of update information;

reading, by the records management and processing system, the information indicating the reason for the current status of the at least one record from the received update information;

normalizing, by the records management and processing system, the information indicating the reason for the current status from the update information; and processing, by the records management and processing system, the at least one record based on the normalized information indicating the reason for the current status and according to one or more workflows executed by the records management and processing system, wherein the one or more workflows process the at least one record based on the received update information and actions defined in one or more predefined rules.

16. The non-transitory, computer-readable medium of claim 15, further comprising, prior to normalizing the information indicating the reason for the current status from the update information, verifying the information indicating the current status of processing of the at least one record and wherein normalizing the information indicating the reason for the current status and processing the at least one record are performed in response to determining the information indicating the current status of processing is valid.

17. The non-transitory, computer-readable medium of claim 16, further comprising, in response to determining the information indicating the current status of processing is not valid, processing the at least one record according to a workflow executed by the records management and processing system.

18. The non-transitory, computer-readable medium of claim 17, wherein processing the at least one record according to the workflow comprises initiating an appeal process.

19. The non-transitory, computer-readable medium of claim 15, wherein normalizing the information indicating the reason for the current status and processing the at least one record based on the normalized information indicating the reason for the current status and according to one or more workflows comprises applying a decision tree, wherein the decision tree comprises one or more branch nodes, each branch node representing a decision, and a plurality of leaf nodes, each leaf node representing a workflow.

20. The non-transitory, computer-readable medium of claim 19, wherein the decision tree comprises at least one branch node representing a decision based on the information indicating the reason for the current status and at least one branch node representing a decision based on information from the at least one record.

* * * * *

UNITED STATES PATENT AND TRADEMARK OFFICE
CERTIFICATE OF CORRECTION

PATENT NO. : 10,977,243 B2
APPLICATION NO. : 15/876529
DATED : April 13, 2021
INVENTOR(S) : Pieter Schouten et al.

Page 1 of 1

It is certified that error appears in the above-identified patent and that said Letters Patent is hereby corrected as shown below:

On the Title Page

In item (72), "Pieter Scheuten" should read --Pieter Schouten--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*